United States Patent [19]

Ross et al.

[11] Patent Number: 5,630,141

[45] Date of Patent: May 13, 1997

[54] HIERARCHICAL APPARATUS AND METHOD FOR PROCESSING DEVICE INTERRUPTS IN A COMPUTER SYSTEM

[75] Inventors: Patrick D. Ross, Sunnyvale; George W. Norman, Fremont, both of Calif.

[73] Assignee: Taligent, Inc., Cupertino, Calif.

[21] Appl. No.: 612,199

[22] Filed: Mar. 7, 1996

Related U.S. Application Data

[63] Continuation of Ser. No. 36,791, Mar. 25, 1993, abandoned.

[51] Int. Cl.$^6$ .................................................. G06F 9/46
[52] U.S. Cl. .......................... 395/734; 395/740; 395/736; 395/868; 395/733
[58] Field of Search .................. 395/733, 734, 395/736, 740, 868, 650, 825

[56] References Cited

U.S. PATENT DOCUMENTS

| | | | |
|---|---|---|---|
| 4,342,082 | 7/1982 | Brown et al. | 395/737 |
| 4,420,806 | 12/1983 | Johnson, Jr. et al. | 364/200 |
| 4,493,080 | 1/1985 | Dysart et al. | 364/200 |
| 4,768,149 | 8/1988 | Konopik et al. | 395/867 |
| 4,779,187 | 10/1988 | Letwin | 395/742 |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,062,042 | 10/1991 | Binkley et al. | 364/200 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,222,215 | 6/1993 | Chou et al. | 395/275 |
| 5,257,375 | 10/1993 | Clark et al. | 395/650 |
| 5,369,770 | 11/1994 | Thomason et al. | 395/733 |
| 5,390,329 | 2/1995 | Gaertner et al. | 395/650 |
| 5,392,435 | 2/1995 | Masui et al. | 395/733 |
| 5,410,709 | 4/1995 | Yu | 395/725 |
| 5,410,715 | 4/1995 | Ishimoto et al. | 395/775 |
| 5,469,571 | 11/1995 | Bunnell | 395/700 |
| 5,483,647 | 1/1996 | Yu et al. | 395/500 |
| 5,515,538 | 5/1996 | Kleiman | 395/733 |

FOREIGN PATENT DOCUMENTS

| | | |
|---|---|---|
| A0531108 | 3/1993 | European Pat. Off. . |
| A0547840 | 7/1993 | European Pat. Off. . |

OTHER PUBLICATIONS

IEEE Pacific RIM Conference on Communications, Computers and Signal Processing, 1 Jun. 1989, Victoria, BC Canada, pp. 269–272. Zheng, et al "Events and Actions: An Object–Oriented Approach to Real–Time Control Systems".

*Primary Examiner*—Christopher B. Shin
*Attorney, Agent, or Firm*—Bookstein & Kudirka

[57] ABSTRACT

A method and apparatus for an innovative hardware independent interface to the external world. The interrupt services are part of an overall I/O model providing an object base I/O system that supports dynamic configuration of the system. The design of these interrupt exploit the advantages of Object Oriented Design (OOD) in an otherwise disorderly world of I/O. Object processing is designed into the architecture at the lowest level routines in the preferred embodiment of the invention. This includes an object oriented design all the way down to interrupt processing abstractions. These interrupt abstractions provide an architecturally sound framework for the dynamic installation, configuration, and timely execution of interrupt handlers.

17 Claims, 8 Drawing Sheets

Hardware Hierarchy

SOFTWARE HIERARCHY

```
static ErrorType SCCinterrupt (SccData *data, void *)     ⟵ 1090
{
    device *addr;
    char  n;
    char  ip;
    ErrorType error;

// Read hardware state    ⟵ 1030 addr = (device *)(SCC_ADDR + SCC_B);
    n    = addr->csr;                  /* dummy read */
    addr->csr = 2;                     /* read channel B RR2 */
    ip = ((addr->csr) >> 1) & 0x07;

// Select Interrupt Handler    ⟵ 1040 n = ip >> 2;                  /* n = 0 (channel B) or 1 (channel A) */
    data->sts = ip & 3;           /* 2-bit status code */

// Call the next level in the interrupt handlers    ⟵ 1050 error = (*(data->services->invokeChild))(1-n, (void *)data);

if (error != kNoError) { /* no SCC ISR present to handle interrupt */
        addr = (device *)(SCC_ADDR + ((n==0) ? SCC_B : SCC_A));
        switch (data->sts) {
        case RCVINT:
            n = addr->dr;           /* remove data */
            break;
        case XMTINT:
            addr->csr = 0x28;       /* reset interrupt for xmt */
            break;
        case EXTINT:
            addr->csr = 0x10;       /* reset EXT/STATUS interrupt */
            break;
        case SPCINT:
            break;
        }
    }
    return kNoError;
}
```

FIG. 11

HIERARCHICAL APPARATUS AND METHOD FOR PROCESSING DEVICE INTERRUPTS IN A COMPUTER SYSTEM

This is a continuation of application Ser. No. 08/036,791 filed on Mar. 25, 1993, abandoned.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT APPLICATIONS

This patent application is related to patent application Ser. No. 07/996,171 entitled Object Oriented Framework System, by Debra L. Orton, David B. Goldsmith, Christopher P. Moeller, and Andrew G. Heninger, filed Dec. 23, 1992, and assigned to Taligent, the disclosure of which is hereby incorporated by reference.

FIELD OF THE INVENTION

The present invention relates generally to a hardware independent interface for external, hardware dependent Input/Output (I/O) systems.

BACKGROUND OF THE INVENTION

Among developers of personal computer or workstation software, it is increasingly important to provide a flexible software environment while maintaining consistency in the user's interface. Interrupt processing on existing systems does not provide multi-level interrupt dispatchers. Multi-level interrupt dispatchers refer to interrupt handlers that also dispatch other interrupt handlers in a recursive manner.

For example, the Apple Macintosh computer has an interrupt handler that dispatches each interrupt handler in an iterative manner for the particular card as it interrupts the system. IBM processors, similarly, distribute all the device interrupts to a single level of interrupt dispatcher. Most of the computer industry follows the IBM model for processing interrupts.

SUMMARY OF THE INVENTION

The preferred embodiment of the invention overcomes the deficiencies of the prior art by providing a hardware independent interface for external, hardware dependent I/O systems. The services provided by this architecture allow a programmer to focus on devices rather than the low level kernel interrupt processing.

The interrupt services are part of an overall I/O model providing an object based I/O system that supports dynamic configuration of the system. The design of these interrupts exploit the advantages of Object Oriented Design (OOD) in an otherwise disorderly world of I/O processing. Object processing is designed into the architecture at the lowest level routines in the preferred embodiment of the invention. This includes an object oriented design all the way down to interrupt processing abstractions. These interrupt abstractions provide an architecturally sound framework for the dynamic installation, configuration, and timely execution of interrupt handlers.

BRIEF DESCRIPTION OF THE DRAWINGS

FIG. 11 illustrates a preferred embodiment in C source code in accordance with the subject invention.

DETAILED DESCRIPTION OF THE INVENTION

Figure 1:
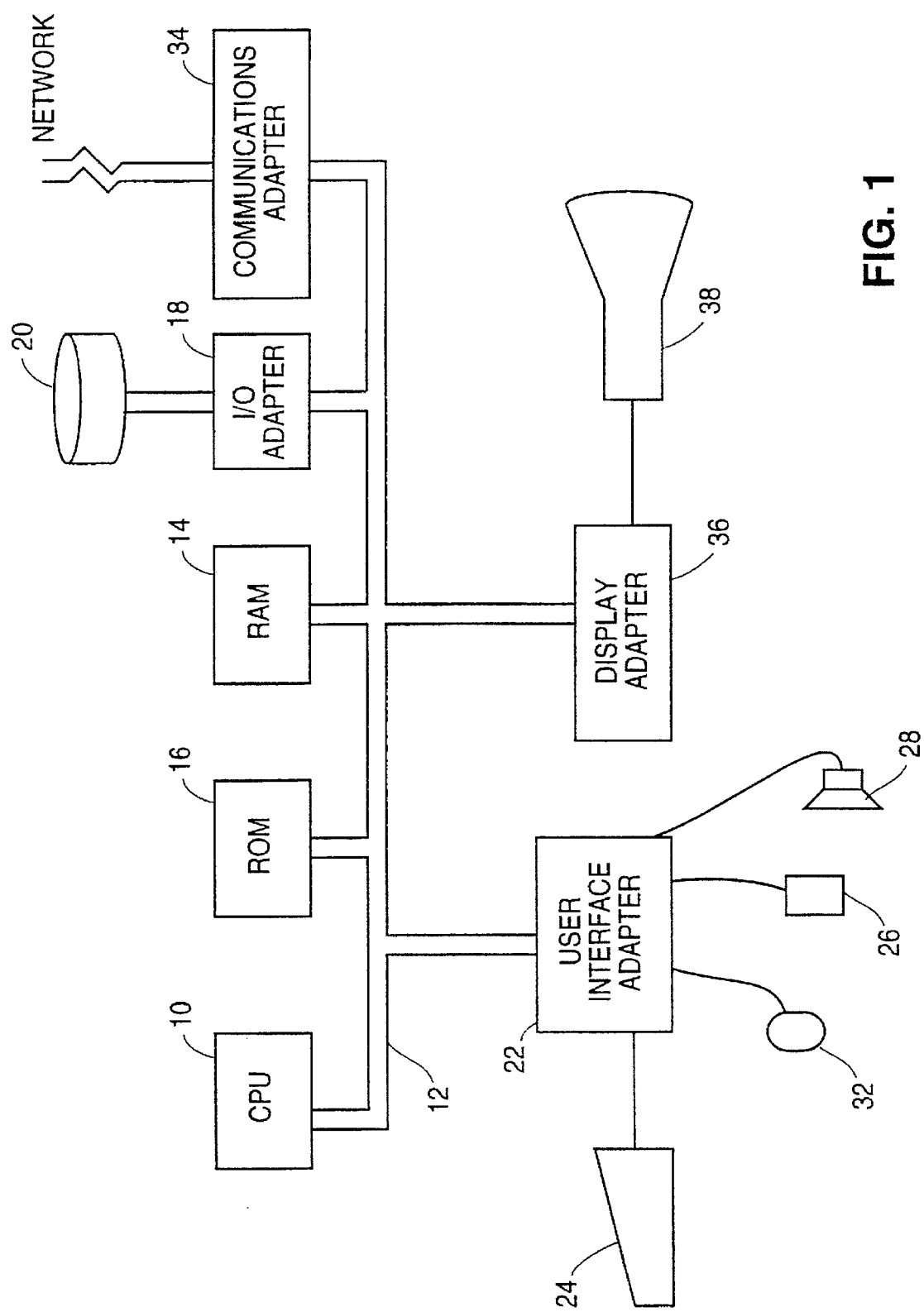
FIG. 1 is a block diagram of a personal computer system in accordance with the preferred embodiment of the invention.

The invention is preferably practiced in the context of an operating system (OS) resident on a personal computer, such as IBM® OS/2® running on the IBM® PS/2® or System/ 7® running on an Apple® Macintosh® computer, or Unix® running on a workstation, such as an IBM RISC System/ 6000 computer. A representative hardware environment is depicted in FIG. 1A, which illustrates a typical hardware configuration of a personal computer workstation in accordance with the preferred embodiment of the invention having a central processing unit (CPU) 10, such as a conventional microprocessor, and a number of other units interconnected via a system bus 12. The workstation shown in FIG. 1A includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38.

The purpose of Interrupt Services is provide a hardware independent interface to for external, hardware dependent I/O systems. The services provided by this architecture allow the programmer to focus on his/her device(s) rather than the low level kernel interrupt processing.

This design includes interrupt processing abstractions. These interrupt abstractions provide an architecturally sound framework for the dynamic installation, configuration, and timely execution of interrupt handlers.

Support "Plug & Play" Objective

The "Plug & Play" objective is an overall goal of the I/O sub-system. Plug & Play operation frees the user from having to deal with configuration files to add or remove I/O hardware.

Dynamic Installation of Interrupt Handlers

A required extension of Plug & Play operation is the dynamic installation of interrupt handlers, to allow for reconfiguration of I/O devices while the system is running. The best example of this is switching the functional use of the serial ports after the system has been booted: such a change would generally cause removal of the "old" interrupt handler and the installation of the "new" one.

Recovery of Hardware Exceptions Within Interrupt Handlers

Most systems are very unforgiving regarding exceptions being generated while the system is running interrupt code. The resulting crash of the system has a significant negative impact on overall system reliability. There are a number of different reasons exceptions occur including, for example, programming errors, temporary bus errors that can be retried successfully, and changing the assumptions under which an interrupt handler is operating.

An example of changing assumptions includes a situation where a once valid memory or hardware device is removed without foreknowledge of the interrupt handler. Recovery from the exception may not be possible if the interrupt handler is critical to system operation. Innovation within the personal computer industry is often slowed or blocked because operating system (OS) software is required to "know" too much about the underlying hardware platform. This hardware specific knowledge locks the hardware configuration into a place where change is very hard to accomplish. The use of object abstractions at this low level in the system encourages hardware and software innovation: both the hardware and the object based software can change without the effects rippling through the rest of the system.

Let Resources Find You

A fundamental problem with existing, configurable I/O systems is the dependency on some form of configuration database. This database in some cases is a large single database file, but commonly it takes the form of small text files scattered throughout the system. A much better paradigm is one which "inverts" this knowledge of configurations, obviating the need for an overall configuration database altogether. Using a design in which resources find their higher-level "parent" objects, the need for the configuration database disappears.

Key Abstractions

Fundamental I/O model

Figure 2:
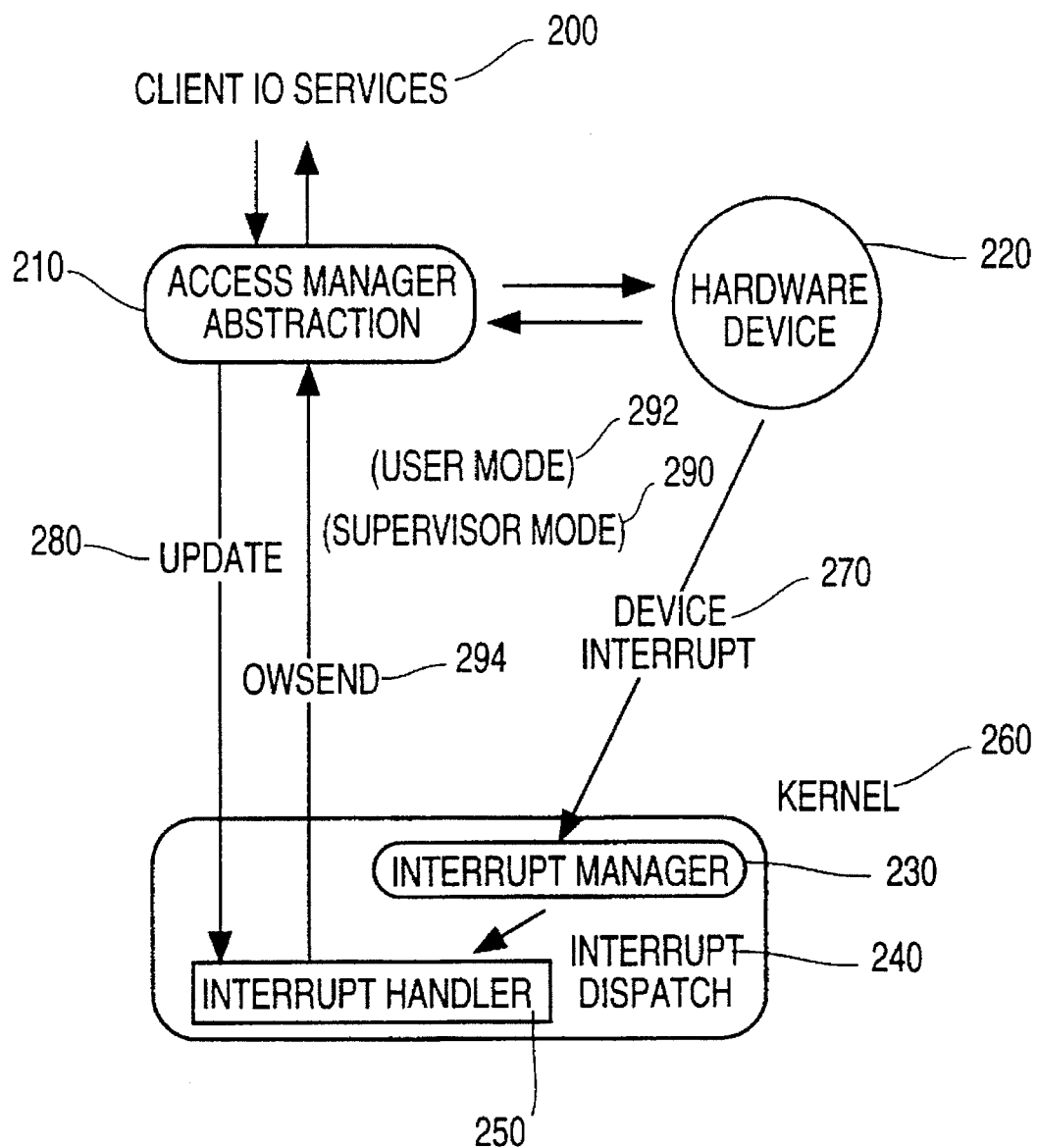
FIG. 2 is an illustration of a preferred embodiment of the input interrupt services in accordance with the subject invention.

The fundament I/O model for the preferred embodiment of the invention consists of four major building blocks illustrated in FIG. 2 and described below.
1) The Access Manager abstraction 210: Access Managers are user-mode abstractions that execute outside the kernel 260;
2) The Interrupt Handler 250: interrupt handlers are device-specific abstractions which process device interrupts;
3) The hardware device 220 to be managed; and
4) Interrupt Manager 230: the interrupt manager manages multiple interrupt handlers, performing the first level interrupt decode and dispatch to the appropriate interrupt handler. The access manager 210 abstraction and its interrupt handler 230 constitute the classic functions found in a driver.

The access manager 210 and interrupt handler 230 have direct access to the hardware device 220 that they manage. This allows the developer to emphasize function within either the access manager 210 or the interrupt handler 230 to meet design goals. In a case utilizing more advanced I/O hardware, the access manager 210 would dominate and the interrupt handler 250 would be minimal.

Interrupt handlers 230 are installed and/or removed at the request of an associated access manager 210. An access manager 210 may not install an interrupt handler 230 if the device being managed does not generate interrupts. Access managers may support multiple devices; in this case the access manager may install an interrupt handler for each device that needs servicing.

Access Managers 210 and interrupt handlers 250 communicate by using two standard interfaces. The access manager 210 can instigate a bi-directional communication transaction using the Update 280 mechanism. The interrupt handler 250 can send a limited amount of data to any task through the OneWaySend (OWSend) 294 messaging service. If a developer is dealing with deficient I/O hardware, the interrupt handler 250 may embody a great deal of the overall I/O functions, and the access manager abstraction 210, a smaller amount.

The Apple SWIM (for Super Woz Interface Machine, a custom Apple Computer chip) floppy controller, for example, is a particularly difficult device to service. It cannot generate interrupts and is 100% compute-bound during sector I/O. A SWIM access manager would be small, simply passing requests to its large "interrupt handler" with the Update operation. The interrupt handler, of necessity, would be required to perform the entire I/O operation, signaling completion with an OWSend. Although this type of I/O device is not preferred for its Kernel memory usage and multitasking effects, it does fit into our fundamental I/O model.

An I/O client, such as an application, interacts with the access manager 210. The access manager 210 then interacts with hardware device 220 directly and/or the device interrupt handler 250 through the "update" request 280. At some point, the hardware device 220 generates an interrupt 270 that is first fielded by the interrupt manager 230 and then dispatched to the appropriate interrupt handler 250. When the interrupt handler 250 has completed some major step in dealing with the hardware device 220, the interrupt handler 250 responds to the access manager 210 with an OWSend 294. The access manager 210 then informs the I/O client that the requested action has been completed.

The Access Manager 210

Why are access managers employed instead of classic drivers? The answer is tied to the expanded role required of I/O software in the preferred embodiment of the invention. Each type of I/O device is likely to have differences in how it is to be accessed.

Printers or tape drives, for example, are unlikely to be shared among multiple clients. Disk drives are inherently sharable. Cards found on expansion buses may have many devices with different access policies. Clearly global device access policy cannot be correctly predicted for all devices today. Therefore, the I/O system cannot set global I/O access policy, since any device access policy that might be imposed today would most likely be incorrect in the future. The I/O system addresses this issue by moving many of the policy issues down to our new drivers. The functional role of our new drivers has been expanded from simple data movement and control of a device, to also include the definition of access policy of the device. Hence the abstraction that defines this access policy is known as an Access Manager.

Interrupt Handlers 250

An Interrupt Handler is an interrupt-source-specific abstraction that processes interrupts and runs within the kernel's address space. An Interrupt Handler will be device specific because its code will have detailed knowledge of the target device. The Interrupt Handler will be generic, however, by virtue of its ability to handle multiple instances of a device at different physical locations.

Each interrupt handler is subclassed from the abstract TInterruptHandler base class. The TInterruptHandler class defines the protocol contract between device specific interrupt handlers and the Interrupt Manager within the kernel. The device specific subclass, as well as any other objects used by the interrupt handler are processed into a normal shared library within the system.

Figure 3:
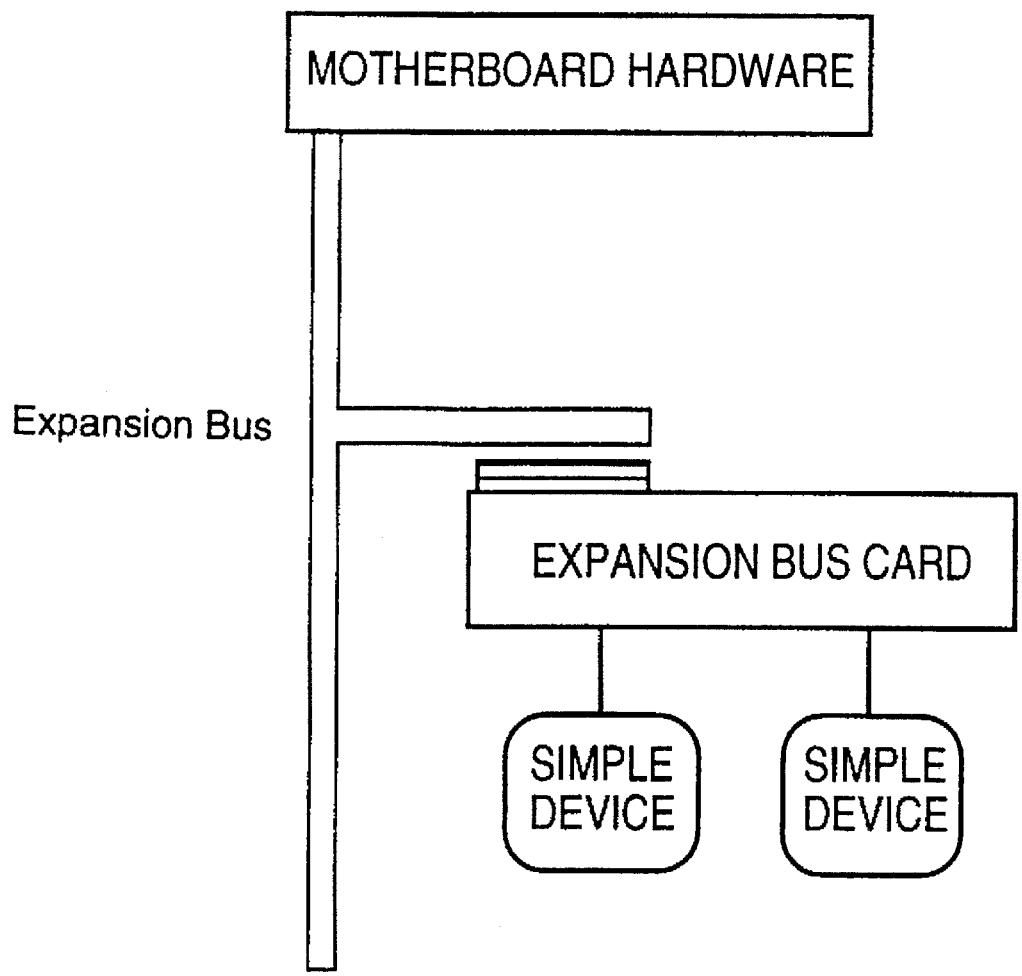
FIG. 3 illustrates a hardware hierarchy of a preferred hardware environment in accordance with the subject invention.

The installation of an interrupt handler from a shared library requires an associated Interrupt Control Task so that the interrupt handler can automatically be removed if the control task is terminated for some reason. Thus, the interrupt services can guarantee that the resources used by the interrupt handler will be reclaimed after the control task is terminated. FIG. 3 illustrates a typical hardware hierarchy in accordance with the preferred embodiment of the invention.

I/O devices can be attached to a system via many diverse hardware paths. Some are built in on the motherboard, some are attached to buses (e.g., Micro Channel, NuBus, ISA, EISA), while others are a mixture of both, for example a NuBus card with a SCSI chip on it. A simplifying abstraction is to view these different hardware configurations as a collection of hardware hierarchies similar to FIG. 3.

Viewing the hardware as a hierarchy infers a natural view of the software for these devices as a hierarchy. A hierarchical view of software fits nicely in restricting the scope of knowledge to obvious layers of the hierarchy. By limiting the scope of knowledge, I/O policy issues can be pushed to the lowest levels of the hierarchy. Upon the occurrence of an interrupt, the root of the software hierarchy passes control down the software hierarchy until the correct device interrupt handler processes the interrupt.

Parent/Child Relationship

Figure 4:
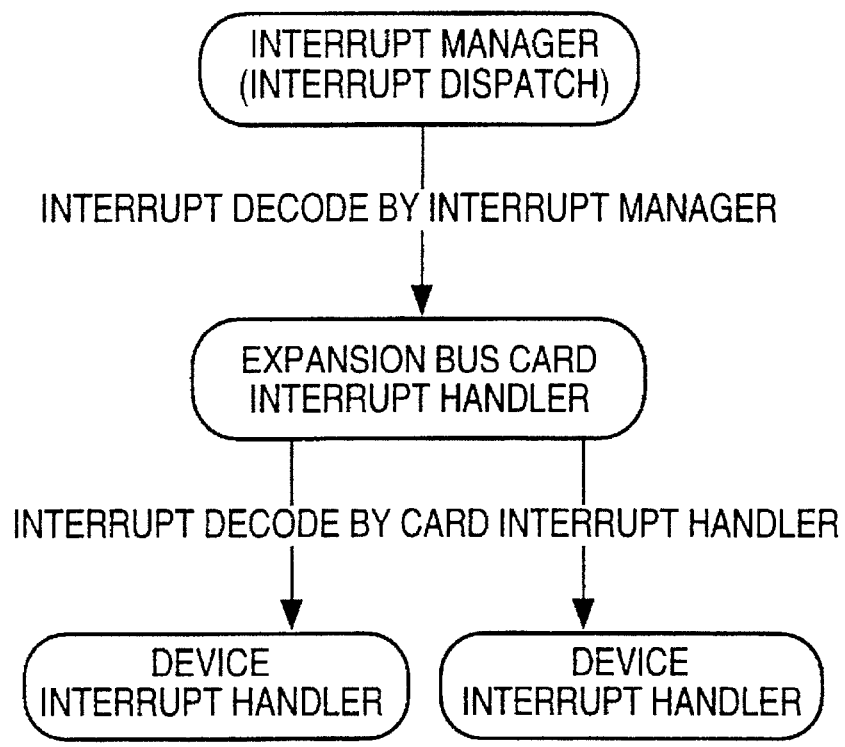
FIG. 4 illustrates a software hierarchy of a preferred software environment in accordance with the subject invention.

The I/O system uses a simple parent/child relationship to manage all the layers in the software hierarchies as shown in FIG. 4. Each interrupt handler and access manager has a parent relationship and may or may not have a child relationship. The parent/child relationship is the simplest model to manage a hierarchical abstraction. This relationship has two important roles to play: first, it defines how the software hierarchy is constructed, and second, it describes the flow of control when an interrupt occurs.

Figure 5:
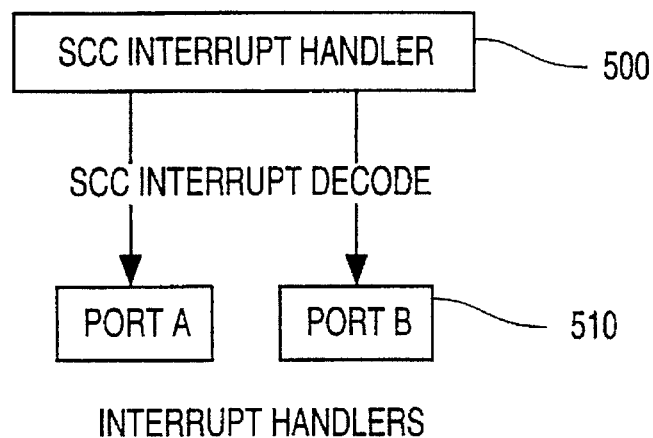
FIG. 5 illustrates a multi-level hardware hierarchy for a standard Serial Communication Controller (SCC) chip in accordance with the subject invention.

Most I/O hardware simplifies the task of defining where functions should be split in the hierarchy. In some hardware, the job of defining the parent/child relationship is not as clear. The Zilog Z8530 Serial Communication Controller (SCC) chip is just such an example. This chip has two distinct ports (A and B) and a common interrupt register. The obvious initial design is to define two serial pods and have an interrupt handler for each port. However, if an interrupt handler for port A were to read the interrupt register, it would get the interrupt status for both ports and clear them by its action: certainly this would not work. The solution is to define two levels of abstraction: the chip 500 and the port 510 as illustrated in FIG. 5.

The chip abstraction is the parent in this example and it exports two software-independent serial ports. When some client (say a Musical Instrument Device Interface (MIDI) application) needs to use an assigned port, it would first acquire the correct parent interrupt handler object and request the MIDI Interrupt Handler installed in association with the parent. This illustrates how the parent/child relationship is used to construct the software hierarchy. The next thing to explain is how the flow of control works in the interrupt case. For the sake of this example let's say port B generates an interrupt. The Interrupt Manager first decodes the processor interrupt and then dispatches the SCC Interrupt Handler. The SCC interrupt handler reads the interrupt register (thereby clearing the interrupts), decodes the values that it finds, and determines that port B has an active interrupt. The handler calls the interrupt manager service InvokeChild to dispatch the port B interrupt handler, passing a copy of the interrupt register to the handler.

After servicing the interrupt for Port B, the interrupt register also initiates a Port A interrupt, the SCC interrupt handler will similarly dispatch the port A interrupt handler. In this way the port interrupt handlers will never need direct access to the shared interrupt register.

Architectural Summary

Figure 6:
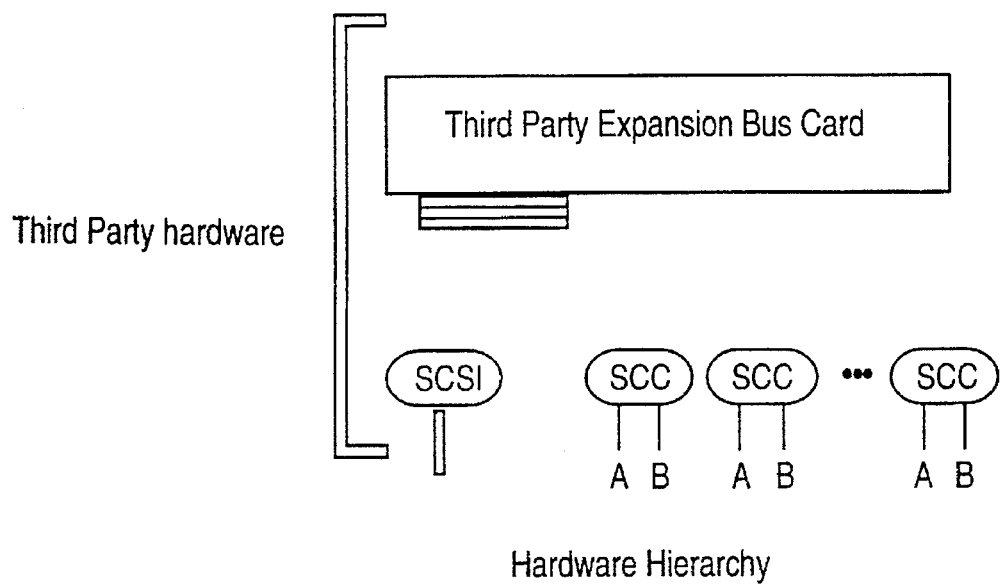
FIG. 6 illustrates an alternative hardware embodiment in accordance with the subject invention.
Figure 7:
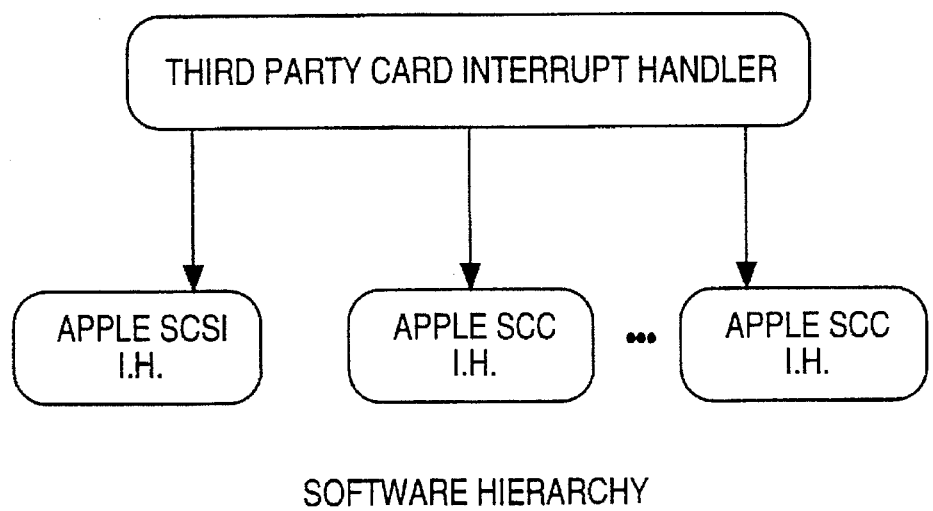
FIG. 7 illustrates an alternative software embodiment in accordance with the subject invention.

As stated above, one of the major goals was the reuse of code and the use of abstractions to move I/O software forward. Here is a simple example of the type of leverage this design affords. Suppose a third party developer decides to manufacture a simple value-added card. Market research exposes the requirement for an expansion card with a SCSI bus and several serial ports. The developer chooses to use the same I/O chips that another manufacturer employs in their products as illustrated in FIG. 6. Building the hardware card is straightforward, but the software to drive the card could be a major undertaking. A preferred embodiment minimizes software changes by maximizing the reusage of existing code as shown in FIG. 7. Because of leverage at both the hardware and software level, a third party developer only has to develop a small part of the software solution. This contribution is the Third Party Access Manager and Interrupt Handler, the rest of the software can be reused, existing code.

For example, in FIG. 6, a Small Computer System Interface (SCSI) chip generates an interrupt which is detected by the first level interrupt decode as the Third Party Expansion Card is interrupting. Then, in FIG. 7, the third party interrupt handler determines which interrupt hardware generated the interrupt. Then, the appropriate interrupt handler is selected to handle the interrupt.

Configuration Access Managers

Configuration Access Managers are responsible for the configuration of a collection of devices. They are the dominant element in the preferred embodiment. There are two kinds of Configuration Access Managers. The first kind has a fixed set of devices to configure and therefore has a straightforward configuration task. The second kind has an unknown number and type of devices to configure. This second kind must therefore act out some protocol to determine what devices are present before it can complete its configuration task.

When any configuration access manager is started up, it has the responsibility to find all the devices for which it is responsible. After the devices have been located and identified, the given configuration access manager makes a policy decision: to instantiate the appropriate access managers or just record that the device was found, but not linked with an access manager.

Figure 8:
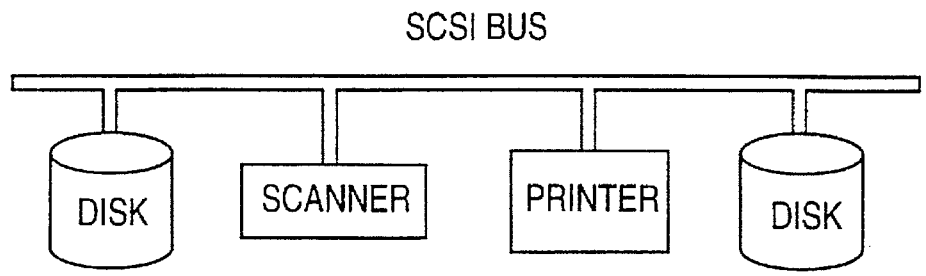
FIG. 8 illustrates a Small Computer System Interface (SCSI) bus Configuration Access Manager.

FIG. 8 illustrates a Small Computer System Interface (SCSI) bus Configuration Access Manager. The Access Manager must follow the standard SCSI protocol to identify what devices are currently attached to the SCSI bus. After a device is found, the configuration access manager then determines whether a device-specific access manager should be instantiated.

An expansion card is an example of a fixed set of devices to configure with more than one device on it. An access manager for an expansion card would have a fixed policy decision. For example, an expansion card containing two SCSI controllers would have the logic associated with SCSI chips. The devices on the SCSI buses would have to be configured by a SCSI bus configuration access manager. This example illustrates how configuration access managers can be applied recursively. The use of a software hierarchy to manage an arbitrary hardware hierarchy allows the I/O system to dynamically configure any hardware platform or configuration.

Software-only Interrupt Handlers

A "software only" interrupt handler is one which is not associated with a hardware device interrupt. There are two basic types of software-only interrupt handlers: pure software modules and "callout" handlers. A pure software module never services interrupts; a callout handler is called by another interrupt handler but does not receive interrupts directly from hardware.

An example of a "pure software" module would be the "interrupt handler" (virtually the entire driver) for the Apple SWIM floppy controller. This module never services interrupts, but instead directly drives the floppy device in a CPU-bound manner. Other examples could be a performance-measurement tool or one which provides some type of specialized coprocessor support.

Interrupt Handler Interaction

In some cases it will be necessary for interrupt handlers and/or access managers to interact. A good example of interrupt handler interaction is the case of a Digital Signal Processor (DSP) modem driver module, which receives updates from the serial access manager (for modem control/status and character transmit) and provides callouts to the serial interrupt handler (for received characters).

Callouts

A callout is a specialized method call from one interrupt handler to another. Arguments to the call are not specified by this architecture, but are agreed between both parties to the callout. Examples of callout interrupt handlers include functions which need periodic timed callouts from the system clock interrupt handler: polling for floppy media insertion on a SWIM, or maintenance of watchdog timeouts on a SCSI operation. Methods in TInterruptHandler indicate an interrupt handler's capabilities for keeping a list of callout clients (e.g., CanDoCallouts, DoAddCallout, and DoDeleteCallout). The client handler has a Callout method which obtains token-based type information associated, for example, mouse events. The data passed to Callout includes references to objects like a TCalloutData, which can be subclassed so that all dispatching handlers could have different args (e.g., a clock wants tickcount). The Interrupt Manager provides AddCallout and DeleteCallout methods so that the manager can call DoDeleteCallout() to clean up when an interrupt handler is removed.

Flowchart of Detailed Logic

Figure 9:
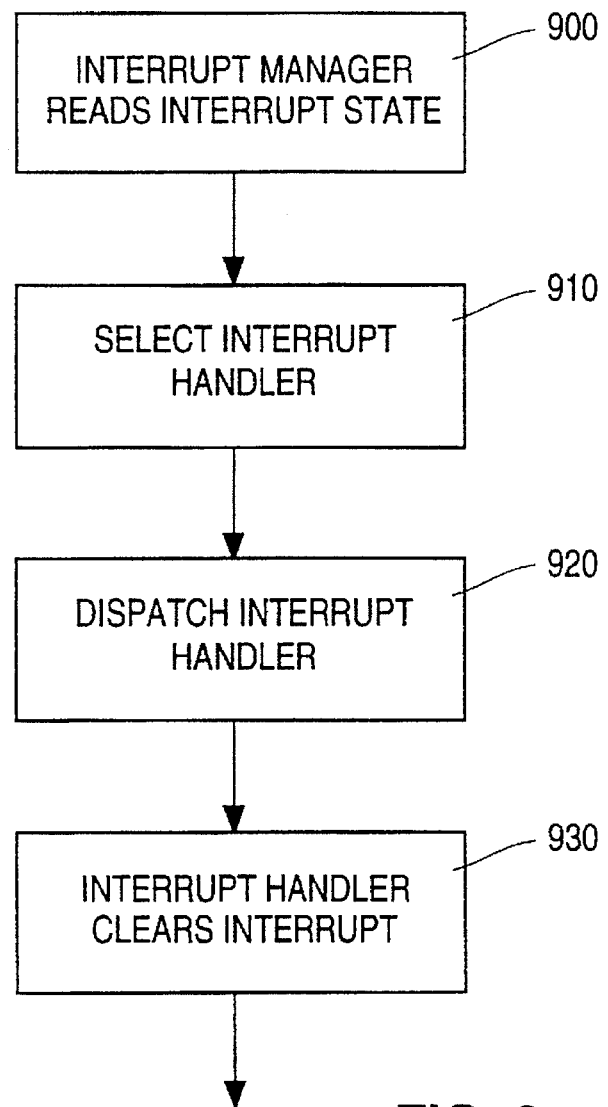
FIG. 9 illustrates a prior art, single level, standard industry interrupt dispatch.

FIG. 9 is a flowchart of a prior art implementation of industry standard interrupt dispatch. Single level interrupt dispatch similar to the logic set forth in FIG. 9 is common in many computer systems. Processing commences at terminal 900 where the interrupt state is queried. Then, at decision block 910 a particular interrupt handler is selected corresponding to the interrupt state. Then, at I/O block 920, the particular interrupt handler is dispatched. Finally, at function block 930, the interrupt is processed according to the selected interrupt handler.

Figure 10:
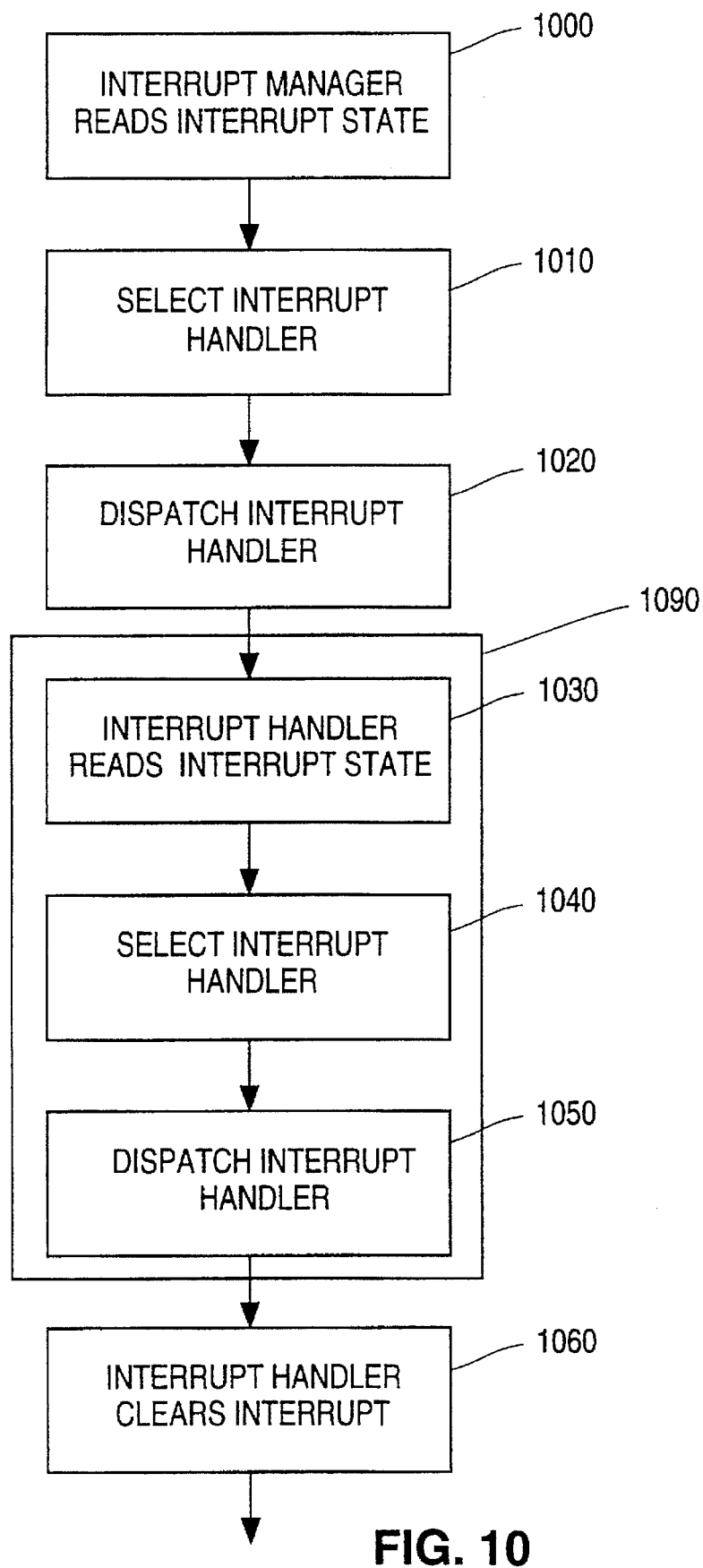
FIG. 10 illustrates a multi-level interrupt dispatch flowchart in accordance with the subject invention.

FIG. 10 illustrates multi-level interrupt dispatch in accordance with a preferred embodiment of the subject invention. Processing commences at terminal 1000 where the interrupt state is queried. Then, at decision block 1010 a particular interrupt handler is selected corresponding to the interrupt state. Then, at I/O block 1020, the particular interrupt handler is dispatched. Then, at function block 1090, the interrupt is processed according to the selected interrupt handler. A preferred embodiment of the invention is set forth at function block 1090. The embodiment is capable of recursively selecting and dispatching interrupts through steps 1030, 1040 and 1050 which correspond to steps 1000, 1010 and 1020. Function block 1090 can be copied and executed as many times as necessary. Finally, at function block 1060, the interrupt handler clears the interrupt or interrupts.

FIG. 11 illustrates the C source code necessary to implement function block 1090 of FIG. 10. Labels in FIG. 11 correspond to the labels found in FIG. 10. Thus, for example, the interrupt state is read at 1030, the interrupt handler is selected at 1040, and the next level of interrupt handler is invoked at 1050.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for providing interrupt processing utilizing interrupt management means for distributing interrupts to interrupt handlers for a plurality of devices connected together in a multi-level branching hardware hierarchy having a root level device and at least one other level having a plurality of leaf level devices in a computer system, the apparatus comprising:

(a) a plurality of interrupt handlers connected together in a multi-level branching software hierarchy having a root level interrupt handler corresponding to said root level device and a plurality of leaf level interrupt handlers, each of said plurality of leaf level interrupt handlers corresponding to one of said plurality of leaf lever devices:

(b) processing means in one of said interrupt handlers at a first level in said software hierarchy for determining a device interrupt state;

(c) a first interrupt handler dispatch means in said one interrupt handler for analyzing said device interrupt state and initiating one of said plurality of interrupt handlers at a second level lower than said first level in said software hierarchy for each of said plurality of devices which is generating an interrupt at the corresponding level in the hardware hierarchy;

(d) means in each of said initiated second level interrupt handlers for servicing said device interrupt state; and (e) processing means for passing information from each of said initiated second level interrupt handlers to an application to complete interrupt notification.

2. An apparatus for providing interrupt processing as recited in claim 1, wherein one or more of said interrupt handlers can appear on more than one level of said software hierarchy to reuse said one or more of said interrupt handlers for handling a device interrupt from one or more of said devices.

3. An apparatus for providing interrupt processing as recited in claim 1, including processing means to support nested interrupts.

4. An apparatus for providing interrupt processing as recited in claim 1, including processing means for supporting multiple programming languages.

5. An apparatus for providing interrupt processing as recited in claim 1, including processing means to maximally reuse existing interrupt handlers.

6. An apparatus for providing interrupt processing as recited in claim 1, including processing means to support multi-function card interrupts.

7. An apparatus for providing interrupt processing as recited in claim 1, including processing means for handling recursive interrupts employing one or more of said interrupt handlers.

8. An apparatus for providing interrupt processing as recited in claim 1, including processing means for independent development of each of said interrupt handlers.

9. A method for providing interrupt processing, utilizing interrupt management means for distributing interrupts to interrupt handlers for a plurality of devices connected together in a multi-level branching hardware hierarchy having a root level device and at least one other level having a plurality of leaf level devices in a computer system, the method comprising the steps of:

(a) creating a multi-level branching software hierarchy having a plurality of interrupt handlers connected together with a root level interrupt handler corresponding to said root level device add a plurality of leaf level interrupt handlers, each of said plurality of leaf level interrupt handlers corresponding to one of said plurality of leaf level devices;

(b) determining a device interrupt state by means of one of said interrupt handlers at a first level in said software hierarchy;

(c) analyzing said device interrupt state in said one interrupt handier and initiating one of said plurality of interrupt handlers at a second level lower than said first level in said software hierarchy for each of said plurality of devices which is generating an interrupt at the corresponding level in the hardware hierarchy;

(d) said device interrupt state in each of said initiated second level interrupt handlers; and (e) passing information to an application from each said second level interrupt handlers to complete the interrupt notification.

10. A method for providing interrupt processing as recited in claim 9, wherein one or more of said interrupt handlers can appear on more than one level of said software hierarchy and the method further comprises: reusing one or more of said interrupt handlers for handling said device interrupt state from one or more of said devices.

11. A method for providing interrupt processing as recited in claim 9, further comprising: supporting nested interrupts.

12. A method for providing interrupt processing as recited in claim 9, further comprising: supporting multiple programming languages.

13. A method for providing interrupt processing as recited in claim 9, further comprising: maximizing reusability of existing interrupt handlers.

14. A method for providing interrupt processing as recited in claim 9, further comprising: supporting multi-function card interrupts.

15. A method for providing interrupt processing as recited in claim 9, further comprising: handling recursive interrupts employing one or more of said interrupt handlers.

16. A method for providing interrupt processing as recited in claim 9, further comprising: developing independent interrupt handlers.

17. An apparatus as recited in claim 1, wherein a plurality of processors and their associated interrupts are handled.

* * * * *